United States Patent
Soman et al.

(10) Patent No.: US 11,086,652 B2
(45) Date of Patent: Aug. 10, 2021

(54) FAULT-TOLERANT APPLICATION VIRTUALIZATION USING COMPUTER VISION

(71) Applicant: VMware, Inc., Palo Alto, CA (US)

(72) Inventors: Sisimon Soman, Sunnyvale, CA (US); Jairam Choudhary, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 378 days.

(21) Appl. No.: 16/258,498

(22) Filed: Jan. 25, 2019

(65) Prior Publication Data

US 2020/0241905 A1   Jul. 30, 2020

(51) Int. Cl.
*G06F 9/455* (2018.01)
*H04L 29/08* (2006.01)
*G06F 11/07* (2006.01)
*G06K 9/62* (2006.01)

(52) U.S. Cl.
CPC ...... *G06F 9/45558* (2013.01); *G06F 11/0709* (2013.01); *G06K 9/6201* (2013.01); *H04L 67/141* (2013.01); *G06F 2009/45575* (2013.01); *G06F 2009/45591* (2013.01)

(58) Field of Classification Search
CPC ............. G06F 9/45558; G06F 11/0709; G06F 2009/45575; G06F 2009/45591; G06F 11/0793; G06F 2009/45579; G06F 9/445; H04L 67/141; H04L 67/10; G06K 9/6201
See application file for complete search history.

(56) References Cited

U.S. PATENT DOCUMENTS

| | | | | |
|---|---|---|---|---|
| 9,207,934 B2* | 12/2015 | Larimore | ............ | G06F 9/455 |
| 2007/0100773 A1* | 5/2007 | Wallach | ............ | G06Q 20/382 |
| | | | | 705/75 |
| 2010/0293532 A1* | 11/2010 | Andrade | ............ | G06F 11/00 |
| | | | | 717/140 |

(Continued)

OTHER PUBLICATIONS

International Searching Authority, International Application No. PCT/US2014/015695, Notification of Transmittal of the International Search Report and the Written Opinion of the International Searching Authority, or the Declaration, International Search Report and Written Opinion of the International Searching Authority dated Jun. 10, 2104.

(Continued)

*Primary Examiner* — Nicholas R Taylor
*Assistant Examiner* — Tania M Pena-Santana

(57) ABSTRACT

A system is described for fault-tolerant delivery of virtualized applications. A client on a client device requests access to a virtualized application. The application is launched in a server-based virtual machine and computer vision is used to determine whether the application launched successfully based on the UI produced by the application. If it is determined that the application failed to launch successfully, an alternative mechanism is used to deliver access to the application using an application storage volume (ASV), which is a mountable container containing the application. In one approach, the ASV is mounted directly to the client device. In another approach, a second virtual machine is launched and the ASV is mounted on the second virtual machine.

20 Claims, 5 Drawing Sheets

(56) References Cited

U.S. PATENT DOCUMENTS

2015/0263983 A1* 9/2015 Brennan ................. H04L 41/12
  709/226
2017/0308367 A1* 10/2017 Clothier .............. G06F 9/44536

OTHER PUBLICATIONS

Jack Madden; "Login VSI's app compatibility tool Login AT applies computer vision to IT"; Published Jul. 19, 2018; https://www.brianmadden.com/opinion/Login-VSIs-app-compatibility-tool-applies-computer-vision-to-IT; Retrieved Jan. 2, 2019.

* cited by examiner

FAULT-TOLERANT APPLICATION VIRTUALIZATION USING COMPUTER VISION

TECHNICAL FIELD

The present disclosure generally relates to application virtualization and virtual desktop infrastructure, and more specifically to techniques for using computer vision for fault-tolerant application virtualization.

BACKGROUND

Cloud computing is among the most prominent trends in technology today. The availability and throughput of local networks and the Internet continue to improve, computational and storage capacity available on the cloud is growing rapidly, and the costs of implementing these services are declining rapidly. As a result, more and more tasks that were traditionally performed locally on users' computing devices are being transferred to the "cloud".

Particularly in the enterprise setting, application virtualization (app virtualization) is a rapidly growing utilization of cloud computing. With application virtualization, the application runs in an isolated execution environment, such as a virtual machine (VM), on a server and users interact with the application in much the same way they would if the application was running locally on their computing device. This is achieved by streaming the graphical user interface (GUI) of the application to the user's client device over the network and transmitting inputs from the user to the application on the server for execution thereon.

The advantages of application virtualization are numerous and it can be an effective way for organizations to provide applications to users. For example, with application virtualization, installation and management of applications is centralized in a single location, instead of allowing many copies and versions to be individually installed on each user device. Then, updates and patches can be performed in the central location instead of having to maintain each user device individually. Virtualized applications are also immediately available to users as soon as they are granted access, without having to wait for long installation processes.

Nonetheless, application virtualization presents many challenges. In a typical virtualized application deployment, numerous applications are installed on an operating system (OS) of an isolated execution environment, such as a virtual machine (VM) on the server and are accessed remotely by different clients. Large numbers of applications are frequently installed on a single VM because maintaining separate VMs for each individual application (or for small sets of apps) would be prohibitively burdensome and resource-consuming.

However, the bundling together of different applications creates a potential for conflict between those applications, something which has become a significant challenge encountered in application virtualization deployments. In certain cases, installing two applications on the same OS can result in one or both applications failing to execute properly. This may happen for several reasons. Applications can have conflicts as a result of using common files, such as OS files, or registry entries. For example, different apps may need different versions of the same DLL (dynamic link library) file so during an installation process, one application may overwrite what was written by a previous application. These and other types of conflicts can result in applications being unable to coexist with each other on the same OS. As a result, when a user tries to access a virtualized application that is in conflict with another application on the VM, one of those applications may fail.

This presents a large problem for administrators. First, conflicts are difficult to detect. For example, a VM for hosting virtualized apps might contain large numbers of applications and the application makeup on the VM may be constantly changing with additions of new applications, application updates, and releases of new application versions, any of which can introduce new conflicts. To ensure application compatibility, each application needs to be tested on an ongoing basis, which can be unduly burdensome. Further, once a conflict is detected, the conflict needs to be resolved by removing at least one of the conflicting applications from the VM and finding alternative ways to provide access to it, which is a further burden on administrators.

A more efficient approach is desirable for providing virtualized applications.

DETAILED DESCRIPTION

Figure 1A:
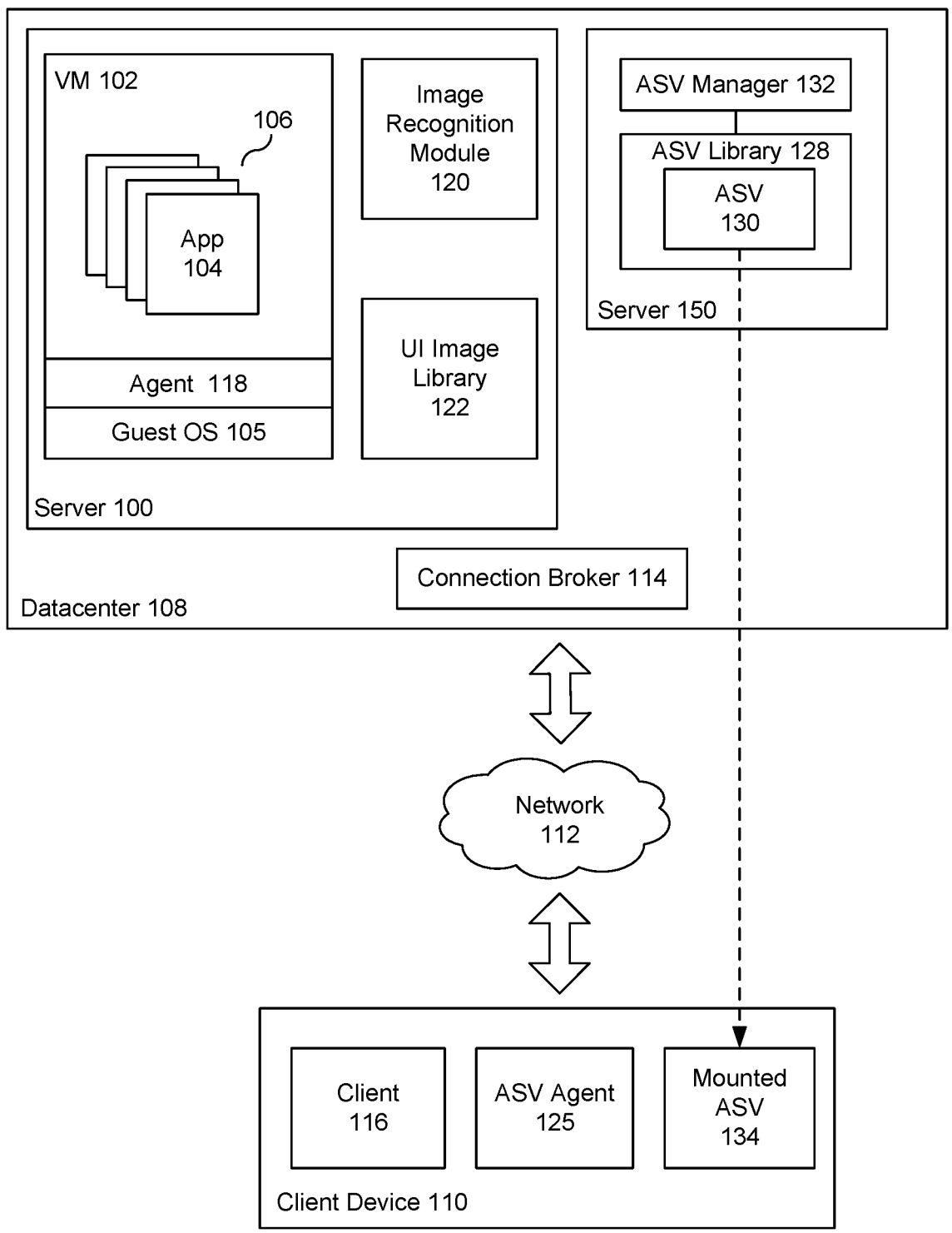
FIG. 1A illustrates an example diagram of a system for fault-tolerant application virtualization implementing direct delivery of an application, in accordance with various embodiments.

Systems and methods in accordance with various embodiments of the present disclosure overcome at least some of the above-mentioned shortcomings and deficiencies by providing more fault-tolerant ways to deploy virtualized applications. In particular, embodiments described herein leverage image recognition techniques to identify when a virtualized application fails to launch successfully on a server and implement alternative mechanisms to provide user access to the app.

The process begins by a user opening a virtualized application via a client application or "client" running on the user's computing device. The client creates a session on a server that hosts the application and requests to launch the application in the session. The application is then launched by the server in a virtual machine (VM). Once the application begins executing, an image recognition module processes a captured digital image of the user interface (UI) produced by the application and determines, based on the image of the UI, whether the application has failed to launch successfully. The image recognition module can do this, for example, by comparing one or more digital images of the application's UI, which can be captured frames or screenshots of the UI, produced when the application is first launched with stored reference images of the application's UI, which may be screenshots or frames corresponding to a successful launch of the application. These reference images may be initially uploaded by an administrator when the virtualized application is first published. For example, if the application's UI matches one or more of the reference images, it can be determined that the application has launched successfully. If they do not match, then it can be assumed that there has been a launch failure. A match between the images occurs if similarity between the UI frame and the reference image surpasses a predetermined threshold.

If the image recognition module does not detect a launch failure, the application virtualization process continues per its normal routine. The application runs in the VM, its UI is streamed to the client, and user inputs into the application are transmitted from the client to the server and carried out in the application.

If, however, the image recognition module determines that the application failed to launch successfully, the server triggers an alternative mechanism for providing access to the application, implementing an application storage volume (ASV) containing the application. As will be described in more detail below, an ASV is a container, such as a virtual disk, containing one or more applications, which can be attached or mounted to a desktop or a VM, making the application(s) contained in the ASV immediately available on the desktop or VM as though they were natively installed. An example of a product implementing ASVs is App Volumes, available from VMware, Inc.

After the application launch failure is detected, an ASV containing the application is retrieved and used to provide alternative access to the application for the client device. In one embodiment, the ASV can be used to perform direct delivery of the application to the client device. In this case, the ASV is downloaded directly to the client device and mounted on the client device by an agent operating on the device. After the ASV is mounted, the application can be automatically launched directly from the ASV on the endpoint device and the user can begin using the application.

In another embodiment, the ASV can be used to perform an alternative virtualized delivery of the application using a different virtual machine. In this case, the client establishes a session with a second VM on the server (or on a different server). In an embodiment, the second VM does not contain the other applications present in the first VM and preferably contains a minimal number of applications overall in order to avoid an application conflict. The ASV is then mounted to the second VM by an agent operating on the VM to deliver the application, and the application is launched in the second VM. The user of the client device can then access the application executing in the second VM remotely via the client session with the second VM. That is, the UI of the application is conveyed to the client and user inputs are conveyed from the client to the second VM and carried out in the application.

With these approaches, if the application initially failed to launch successfully due to a conflict with another app, the alternative mechanisms for providing access to the application would most likely result in a successful launch because the odds of the same conflict taking place under the alternative mechanism are minimal. Namely, with the direct delivery approach, conflict is unlikely because the user's device will generally contain fewer applications (or different applications) with which there is potential for conflict than the VM that hosts the virtualized app. Likewise, with the alternative virtualized delivery from a different VM, the second VM may contain none or only a few applications with which there is any potential for conflict.

From the user's perspective, the transition from the standard mechanism for application access to an alternative mechanism can be performed seamlessly and without interruption so that the user can access the application as he or she would normally in spite of the application failing to launch successfully initially. As a result, a fault-tolerant application virtualization system is enabled that can conveniently deliver a virtualized application to a user even in situations where the application initially fails to launch due to a conflict with another application on the server.

FIG. 1A illustrates an example diagram of a system for fault-tolerant application virtualization implementing direct delivery of an application, in accordance with various embodiments. As illustrated in the example of FIG. 1A, a server 100 hosts numerous virtual applications 106, that are contained in a virtual machine (VM) 102 running on the server 100. For example, the server 100 can be a remote desktop session host (RDSH) server. The server 100 can be located in a datacenter 108 of an enterprise or a third-party service provider. While only a few applications (106) are illustrated in the figure, a real-world implementation may include hundreds or thousands of applications installed in a VM (e.g., 102).

The VM 102 can be any kind of isolated execution environment where the apps 106 can run. For example, the VM 102 may be an operating system (OS) or application environment that is installed on virtualization software that imitates or emulates dedicated hardware. In various embodiments, the server 100 includes virtualization software (not pictured) that supports the execution of the VM 102. The virtualization software may be a hypervisor, a virtual machine manager (VMM) or other software that allows one or more virtual machines (e.g., 102) to share the physical resources of the server 100. The VM 102 can execute a guest operating system 105 that hosts the apps 106. In other embodiments, the VM 102 can be implemented using various other approaches that enable isolated execution of applications, such as operating-system-level virtualization or containerization.

The server 100 is communicatively coupled with a client device 110 via a network 112. Network 112 may be a wide area network (WAN), or other form of remote communication link between the server 100 and the client device 110. Network 112 may further include numerous other components, such as one or more firewalls, management servers, etc., which are not shown here so as not to obscure salient features of the virtual application environment. The client device 110 can be any type of computing device, such as a smartphone, tablet, laptop, desktop computer, etc.

By way of illustration, server 100 can interoperate with the client device 110 to provide virtual application services to a user of the client device 110. For example, server 100 can give the user of the client device 110 access to applications 106 available in the VM 102. The user may be able to view on a desktop graphical user interface (on a local display device) of the client device 110 what applications (e.g., 106) are available to the user on the server 100 and select an application to access. For example, if the user is accessing application 104, the client device 110 can allow the user to view on a desktop graphical user interface (on a local display device) of the client device 110 the UI of the application 104 that is running remotely on the server 100, as well as provide commands for controlling the application 104. In this manner, the user of the client device 110 can interact with the application 104 hosted on the server 100 as if the application were executing locally on the client device 110. For the sake of being concise, only one client device 110 is illustrated in the example of FIG. 1A; however, a real-world implementation would generally include numerous client devices connected to the server 100, each through a separate session. Hence, the server 100 might host hundreds of apps (e.g., 106) on the VM 102 that can be accessed by different users via different sessions at any given time.

In such virtual application environments, the client device 110 can execute a virtual application client 116. For example, the client 116 can be a stand-alone, designated client application ("native client"), or a web browser ("web client"). In some cases, a standard web browser may be modified with a plugin to operate as a web client. The interaction between the application 104 and the client device 110 can be facilitated by such a client 116 running in the OS on the client device 110, which communicates with a server-side virtual application agent 118 that is running on the guest OS 105 inside the virtual machine 102. In particular, the interaction can be performed by the agent 118 transmitting encoded visual display information (e.g., framebuffer data) over the network 112 to the client 116 and the client 116 in turn transmitting user input events (e.g., keyboard, mouse events) to the agent 118. Interactions between the client 116 and the agent 118, including transmission of encoded visual display information from the agent 118 to the client 116 and user input events from the client 116 to the agent 118 can be performed using a remote desktop protocol, such as Remote Desktop Protocol (RDP), PC-over-IP protocol (PCoIP), VMware Blast, virtual network computing (VNC) protocol, or the like.

The datacenter 108 further includes a connection broker 114, which can be software for allowing clients (e.g., 116) to access server-hosted desktops and applications (e.g., 106). The connection broker 114 can act as a "middle" component between the applications 106 on the server 100 and the clients (e.g., 116) that are used to access the applications. The connection broker 114 can be responsible for functions such as authenticating users (e.g., based on user name and password combinations) and establishing connections between the VM 102 and applications 106 running on the server 100 in the datacenter 108 and clients (e.g., 116). In various embodiments, the connection server 114 can be located in the datacenter 108 or elsewhere on the network 112.

It should be noted that the particular virtual application environment illustrated in FIG. 1A is shown purely for purposes of illustration and is not intended to be in any way inclusive or limiting to the embodiments that are described herein. For example, a typical deployment could include more servers, which may be distributed over multiple datacenters, which might include many other types of devices, such as switches, power supplies, cooling systems, environmental controls, and the like, which are not illustrated herein. Similarly, a single server would typically host many virtual machines, and numerous client devices would be typically communicatively linked to the servers. It will be apparent to one of ordinary skill in the art that the example shown in FIG. 1A, as well as all other figures in this disclosure have been simplified for ease of understanding and are not intended to be exhaustive or limiting to the scope of the invention.

Thus, the process of accessing a virtualized application begins by a user of the client device 110 requesting to access the application on the server 100. For example, the user may be able to view what applications are available for the user to access on the server 100 via a UI of the client 116 and select to open application 104. In response, the client 116 creates a session on the server 100 (e.g., via the connection broker 114), unless a session is already created, and requests the server (e.g., via the agent 118) to launch the application 104 in the created session. For example, a shell command can be issued to launch the application 104 in the session. The application 104 is then launched in the virtual machine (VM) 102.

However, as discussed above, because the VM 102 contains numerous apps 106, the application 104 may fail to launch successfully due to a conflict with one of the of the other apps 106 in the VM 102. To determine whether the application 104 has failed to launch successfully, an image recognition module 120 executing on the server 100 views the user interface (UI) produced by the application 104 to detect any failures based on the UI. The image recognition module 120 can process captured digital images (frames or screenshots) of the user interface (UI) produced by the application 104. For example, once the application 104 is launched, digital images of its UI can be produced by taking screenshots or capturing UI frames and the digital images can be conveyed to the image recognition module 120. In an embodiment, digital images of the UI can be produced by intercepting frames of the UI (by the image recognition module 120) before they are transmitted to the client 116. The image recognition module 120 can perform visual analysis on the digital images of the UI to determine whether a failure has occurred. The image recognition module 120 can do this, for example, by comparing the digital images of the app's 104 UI with one or more reference images (e.g., stored screenshots of the app's 104 UI that correspond to a successful launch of the app). For example, the image recognition module 120 can retrieve the reference images for the application 104 from a UI image library 122 on the server 100 that stores reference images corresponding to a successful launch for each virtualized application 106.

In this example, the image recognition module 120 is located on the server 100. However, in other embodiments the image recognition module 120 can be located elsewhere on the network, such as on the client device 110, in which case the client device 110 would communicate a detected failure of the application 104 to the server 100 or to the connection broker 114.

In various embodiments, such reference images can be generated and uploaded to the library 122 manually by an administrator or by an automated mechanism. For example, an administrator can launch the application 104 and capture one or more reference images, such as of the app's 104 main page, etc. that evidence that the application 104 has launched successfully. In an embodiment, reference images can be generated by a script that launches apps and takes a screenshot, instead of manually by an administrator. Once obtained, the reference images are saved in the UI image library 122 on the server 100 in association with the corresponding application (e.g., 106). The image recognition module 120 can then retrieve that reference image or images and compare it/them to the digital images of the UI (frames or screenshots) being produced by the application 104 upon launch. In various embodiments, if any of the digital images of the app's 104 UI match with any of the stored reference images, then the image recognition module 120 can determine that the launch was a success. If there is no match, then the image recognition module 120 can determine that the application 104 has failed to launch successfully. The system can also implement a threshold for passing, for example, if a digital image of an application 104 UI is over a threshold percentage (e.g., 95%) similar to a reference screenshot, it can be deemed a match. As will be appreciated by those skilled in the art, other methods may be used for implementing computer vision for viewing application UIs to determine whether an application launch is successful, and this invention is not limited to any particular method.

Once the application 104 is launched in the VM 102, if the image recognition module 120 does not detect a launch failure, the application virtualization process continues per its normal routine. That is, the application 104 runs in the VM 102, its UI is streamed to the client 116 via the remoting protocol session, and user inputs into the application 104 are transmitted from the client 116 to the server 100 via the remoting protocol session and carried out in the application 104.

If, however, the image recognition module 120 determines that the application 104 failed to launch successfully, the server 100 triggers an alternative mechanism for providing access to the application 104, implementing an application storage volume (ASV) containing the application 104 to provide the user access to the app.

In various embodiments, an ASV can be a container, such as a virtual disk (VMDK, VHD, etc.), containing one or more applications, which can be attached or mounted to a target computing system (which may be a virtual machine or a physical device) making the application(s) contained in the ASV immediately available in the target system as though they were natively installed. For example, the ASV can contain software components that emulate an actual disk storage device allowing it to be mounted on a target computing system as if it was an actual disk. The ASV software components can blend or merge application files from the virtual disk (e.g., VHD/VMDK) and registry setting with local files and registry on the target computing system. The merged view appears exactly as if the application was installed locally on the target computing system. In various embodiments, the ASV attachment is performed by an ASV agent operating on the target computing system. For example, the ASV agent can have an operating system kernel mode filter driver that merges files/registries from the ASV virtual disk with the local disk of the target computing system.

In various embodiments, once the image recognition module 120 determines that the application 104 failed to launch successfully, an ASV 130 containing the application 104 can be used to perform a direct delivery of the application 104 to the client device 110. The ASV 130 can be retrieved from an ASV library 128 on a different server 150 in the datacenter 108. For example, a request for the ASV 130 can be conveyed to an ASV manager 132 (also on the server 150) responsible for managing ASV deployments and responding to requests for ASVs. The ASV library 128 can store ASVs for various apps, including the apps 106 in the VM 102, that can be used in cases of launch failures of those apps 106. The server 100 (or the ASV Manager 132) can store information for locating ASVs (e.g., 130) corresponding to the hosted virtualized applications 106, and when an application fails to launch, such as application 104, an ASV containing the failing application can be requested and located based on this information. In the example of FIG. 1A, the ASV library 128 and manager 132 are located on the server 150 in the datacenter 108. In other embodiments, the ASV library 128 and manager 132 may be in different locations, such as on a separate server in a different datacenter, or on the same server 100 in the datacenter 108.

Once the ASV 130 is located in the ASV library 128, it can be downloaded to the client device 110 and mounted on the client device 110 by an ASV agent 125 operating on the client device 110. The example FIG. 1A, illustrates the mounted ASV 134 on the client device 110. When the ASV agent 125 mounts the virtual disk, it also configures the client device 110 so that the application 104 contained in the mounted ASV 134 becomes available on the client device 110 and appears and performs (to the user accessing the application on the client device 110) natively installed. For example, the ASV agent 125 can merge application files and registry settings from the ASV 134 with local files and registry on the client device 110 to make the application executable directly from the mounted ASV 134. Once the ASV 134 is successfully mounted, the application 104 can be launched on the client device 116, which can be performed automatically, and the user can begin using the application directly on the client device 110.

In various embodiments, parts of the direct application delivery process can be coordinated by the connection broker 114. For example, when the failure is detected, the server 100 can notify the broker 114 of the failure and/or request the broker 114 to provide client 116 access to the application 104 using an alternative mechanism, such as by performing a direct delivery of the application 104. The server 100 can also send information for locating/identifying the ASV 130 to the broker 114. For example, the server 100 can store a link, a path, or other identification/location information corresponding to the ASV 130 (which can be provided by an administrator) and send this information to the broker 114.

In response to the request from the server 100, the broker 114 can proceed with the direct delivery mechanism. For example, the broker 114 can communicate the application 104 launch failure to the client 116 and/or send an instruction to the client 116 to initiate direct delivery of the application 104. In response, the client can launch the ASV agent 125, pass the information about the ASV 130 (e.g., path, location, etc.) that the broker 114 received from the server 100 to the ASV agent 125, and request the ASV agent 125 to launch the application 104 from the ASV 130. The ASV agent 125 can communicate a request for the ASV 130 to the ASV manager 132, the ASV manager 132 can locate the ASV 130 in the ASV library 128 and convey the ASV 130 to the ASV agent 125. The ASV agent 125 can then mount the ASV 134 on the client device 110 and launch the application 104 from the mounted ASV 134 directly on the client device 110.

In various embodiments, a standard remote desktop protocol can be modified to allow the interchange of information necessary for performing the direct delivery mechanism to utilize the same connection or protocol session that is established by the client 116 for accessing the virtual application 104 on the server 100. For example, the communications described above between the connection broker 114 and the client 116 for coordinating direct delivery of the application 104, such as communicating by the broker 114 to the client 116 that the application 104 failed to launch, instructing the client 116 to initiate direct delivery of the application 104 to the client device 110, and passing the information about the ASV 130 (e.g., path, location, etc.) to the client 116, can be performed over such a modified remote desktop protocol.

Figure 1B:
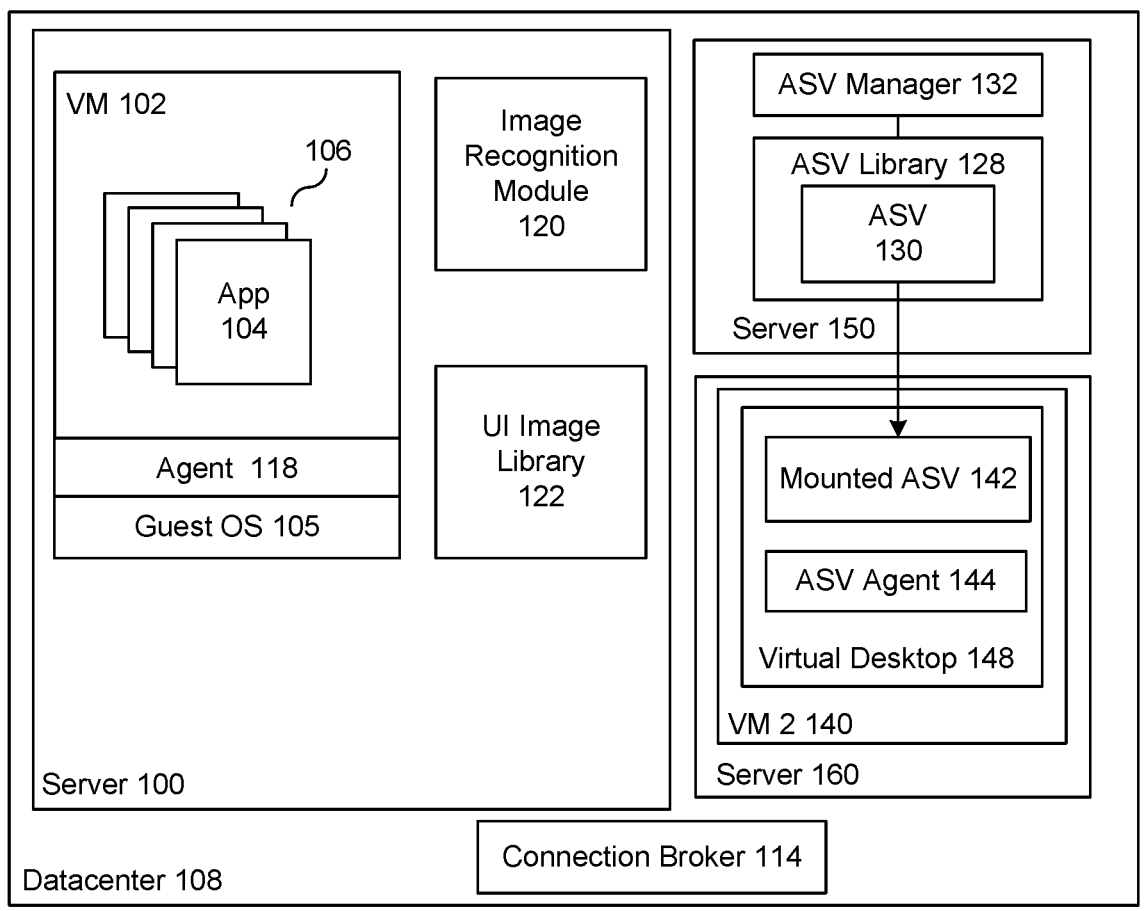
FIG. 1B illustrates an example diagram of a system for fault-tolerant application virtualization implementing alternative virtualized delivery of an application, in accordance with various embodiments.
Figure 1B:
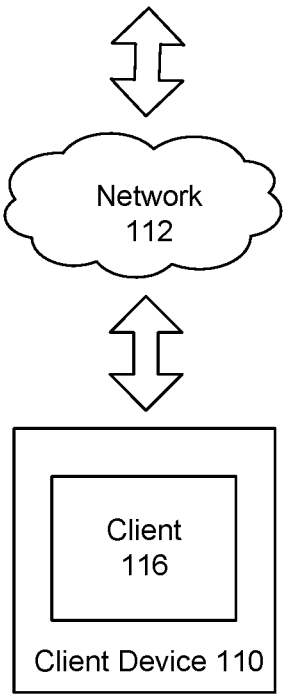

FIG. 1B illustrates an example diagram of a system for fault-tolerant application virtualization implementing alternative virtualized delivery of an application, in accordance with various embodiments. The example of FIG. 1B illustrates the system introduced in FIG. 1A but where alternative virtualized delivery of the application is performed instead of direct delivery after the application 104 failure to launch successfully is detected. Accordingly, as applicable, the components illustrated in FIG. 1B can have analogous functionality to the corresponding components illustrated in FIG. 1A. Like direct delivery, alternative virtualized delivery in the example of FIG. 1B is performed using the ASV 130 containing the application.

In this case, after the image recognition module 120 detects that the application 104 failed to launch successfully, the client 116 establishes a session (e.g., a remote desktop protocol session) with a second VM (VM 2) 140 on another server 160 in the datacenter 108. For example, the second VM 140 can be launched by the server 160 from a VM template or it can be assigned from a pool of VMs. In this example, VM 2 140 is located on the server 160, however, in other embodiments VM 2 140 may be elsewhere, such as in a separate datacenter or on one of the servers 100, 150 in the same datacenter 108. VM 2 140 generally would not contain the applications 106 present in VM 102 and would preferably contain a minimal number of applications overall in order to avoid an application conflict with the application 104. The VM 2 140 executes producing a virtual desktop 148, which can be a computing environment where applications can be launched, and with which a user can interact remotely.

Once VM 2 140 is executing, the ASV 130 containing the application 104 can be used to deliver the application 104 to the virtual desktop 148. The ASV 130 can be retrieved from the ASV library 128 on the server 150. For example, a request for the ASV 130 can be conveyed to the ASV manager 132 and the ASV 130 can be returned in response to the request. As in the example of FIG. 1A, the server 100 (and/or ASV manager 132) can store information for locating and/or identifying ASVs (e.g., 130) corresponding to the hosted virtualized applications 106 and when an application fails to launch, such as application 104, an ASV containing the failing application can be requested and/or located based on this information.

Once the ASV 130 is located in the ASV library 128, it can be mounted or attached to the virtual desktop 148 by an ASV agent 144 operating in the virtual desktop 148. The example of FIG. 1B illustrates the ASV 142 mounted to the virtual desktop 148. As in the previous example, when the ASV agent 144 mounts the ASV 142, it configures the virtual desktop 148 so that the application 104 contained in the ASV 142 becomes available in the virtual desktop 148 and appears and performs natively installed. For example, the ASV agent 144 can merge application files and registry settings from the ASV 142 with local files and registry on the virtual desktop 148 to make the application executable directly from the mounted ASV 142 in the virtual desktop 148.

In various embodiments, the physical location of the ASV 130 may not change during the mounting or attachment of the ASV 130. The assignment of the ASV 130 may be performed by merely pointing or directing the virtual desktop 148 to the location of the ASV 130, without necessarily moving the ASV 130 to a different physical location or making copies of the ASV 130. In this way, a single virtual disk or ASV (e.g., 130) may be assigned to any number of VMs quickly and efficiently. In other embodiments, the ASV 130 may be copied and/or downloaded to different physical locations and mounted. For example, in embodiments where VM 2 140 is not located in the datacenter 108, it may be preferable to convey a copy of the ASV 130 to the VM 2 140 and mount the actual copied ASV 130 to VM 2 140.

Once the ASV 142 is successfully mounted, the application 104 can be launched on VM 2 140 from the mounted ASV 142, which can be performed automatically, and the user of the client device 110 can interact with the application 104 running in the virtual desktop 148 on the client 116 via the remote desktop session. Namely, the user interface of the virtual desktop 148 can be streamed to the client 116 via the remoting protocol session, and user inputs into the virtual desktop 148 can be transmitted from the client 116 to the virtual desktop 148 via the remoting protocol session and executed in the virtual desktop 148. Hence, the user will have remote access to the virtual desktop 148 and will be able to control the application 104 because it will be open and running in the virtual desktop 148. However, because the user of client device 110 only needs to access the application 104 and not the entire desktop 148 GUI, the interface of the virtual desktop 148 can be hidden and only the UI of the application 104 can be transmitted or presented to the client device 110 (and displayed in the client 116 UI), so that the user sees and interacts just with the application 104 and not with the entire virtual desktop 148.

In various embodiments, parts of the alternative virtualized delivery process can be coordinated by the connection broker 114. For example, when the failure is detected, the server 100 can notify the broker 114 of the failure and/or request the broker 114 to provide client 116 access to the application 104 using an alternative mechanism, such as by performing an alternative virtualized delivery of the application 104. The server 100 can also send information for locating/identifying the ASV 130 to the broker 114. For example, the server 100 can store a link, a path, or other identification/location information corresponding to the ASV 130 (which can be uploaded/provided by an administrator) and send this information to the broker 114. Once the connection broker 114 is instructed to perform the alternative virtualized delivery, it can provision VM 2 140 (e.g., launch it from a template or obtain it for a VM pool) and establish a remote desktop session between the client 116 and VM 2 140. The broker 114 can instruct VM 2 140 to launch the ASV agent 144, to mount the ASV 130, and to launch the application 104 from the ASV 130 once it is mounted (in another embodiment, these instructions to VM 2 140 can also be produced by the server 100). The broker 114 can also pass the information about the ASV 130 (e.g., path, location, etc.) that the broker 114 received from the server 100 to the ASV agent 144, so that the ASV agent 144 can use this information for requesting/obtaining the ASV 130.

Similar to the example of FIG. 1A, a standard remote desktop protocol can be modified to allow the interchange of information necessary for performing the alternative virtual delivery mechanism to utilize the same connection or protocol session that is established by the client 116 for accessing the virtual application 104 on the server 100. For example, the communications described above between the connection broker 114 and VM 2 140 coordinating the launching of the ASV agent 144, attachment of the ASV 130 to the virtual desktop 148, and launching the application 104 from the mounted ASV 142 can be performed over such a modified remote desktop protocol.

In various embodiments, numerous factors can be taken into account for determining whether to implement direct delivery or alternative virtualized delivery of the application 104 after it is detected that the application 104 has failed to launch successfully. Such factors can include the type of client device 110 (smartphone, tablet, laptop, etc.), the connectivity of the client device 110 (e.g., the speed or throughput of its network connection), the operating system of the client device 110 (e.g., Android, Windows, Mac OS, etc.), and whether the device 110 has access to the network where the ASV 130 is located. For example, direct delivery may not be suitable for some types of client device 110, such as smartphones or tablets. Factors about the application 104 itself can also be taken into account (e.g., some applications may be preferred for direct delivery, while other may be preferred for alternative virtualized delivery). In an embodiment, the system can be configured to take into account any of the above factors to determine whether to implement direct delivery or alternative virtualized delivery of the application 104 after it is detected that the application 104 has failed to launch successfully. For example, the connection broker 114 can contain logic for making such a determination based on any of the above factors.

Figure 2:
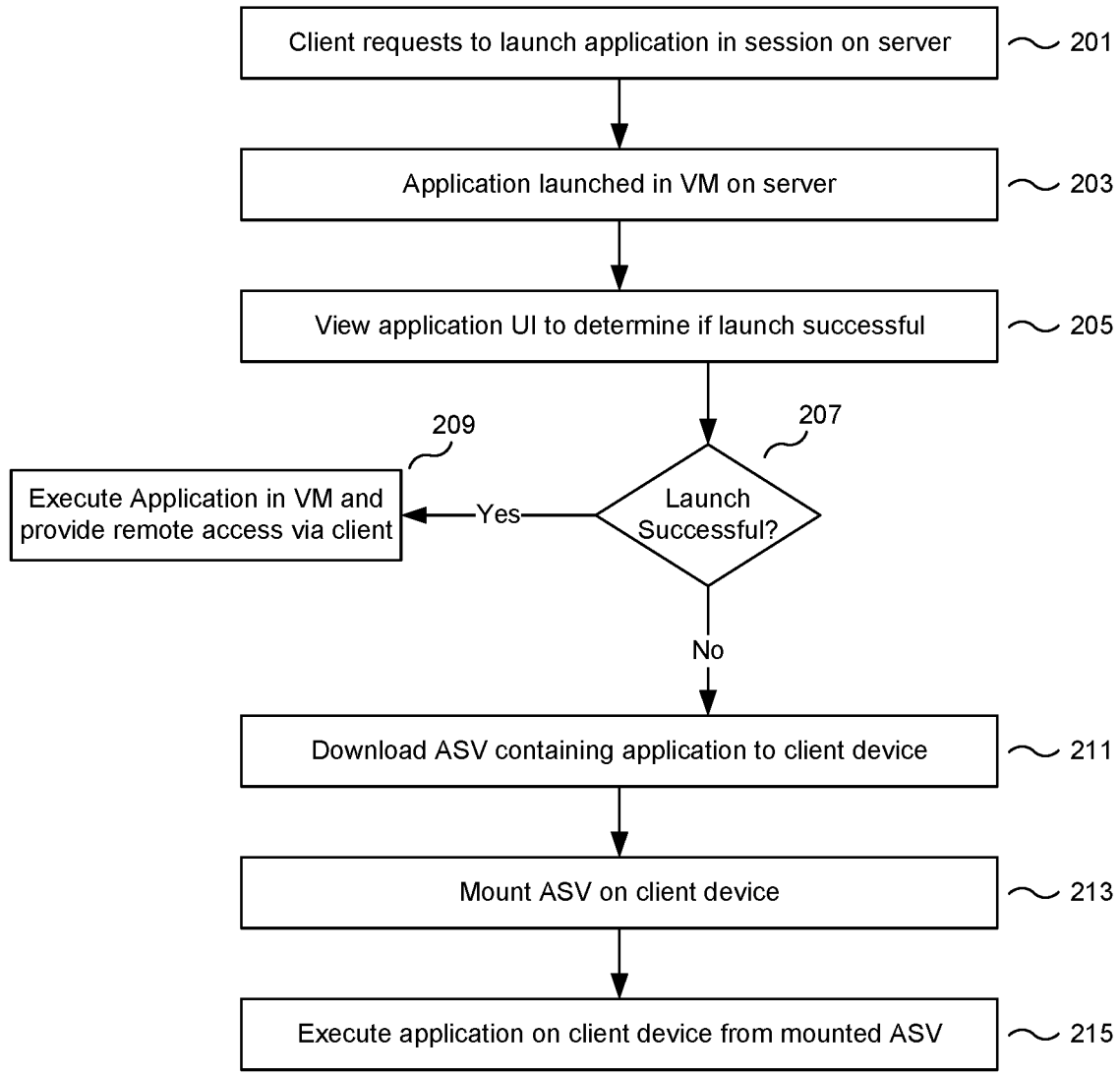
FIG. 2 illustrates a process flow for fault-tolerant application virtualization implementing direct delivery of an application, in accordance with various embodiments.

FIG. 2 illustrates a process flow for fault-tolerant application virtualization implementing direct delivery of an application, in accordance with various embodiments. The process begins in step 201 with a request being sent from a client operating on a client device to a server configured for hosting virtualized applications to launch an application in the client's session on the server. In step 203, the server launches the application in a VM in response to the request. In step 205, the UI produced by the application is viewed to determine if the application launched successfully. For example, this may be performed by processing a digital image (or images) of the UI produced by the launched application. In step 207, a determination is made on whether the application launched successfully. If the application launched successfully, then the process proceeds to step 209, where the application continues executing in the first VM and the user is provided remote access to the executing application via the client session. For example, the executing application's UI is streamed to the client, and user inputs into the application are transmitted from the client to the server and executed in the application.

If, the application did not launch successfully in decision 207, then the process proceeds to step 211, where an ASV containing the application is downloaded to the client device. The ASV is mounted on the client device in step 213. In step 215, the application is executed on the client device from the mounted ASV.

Figure 3:
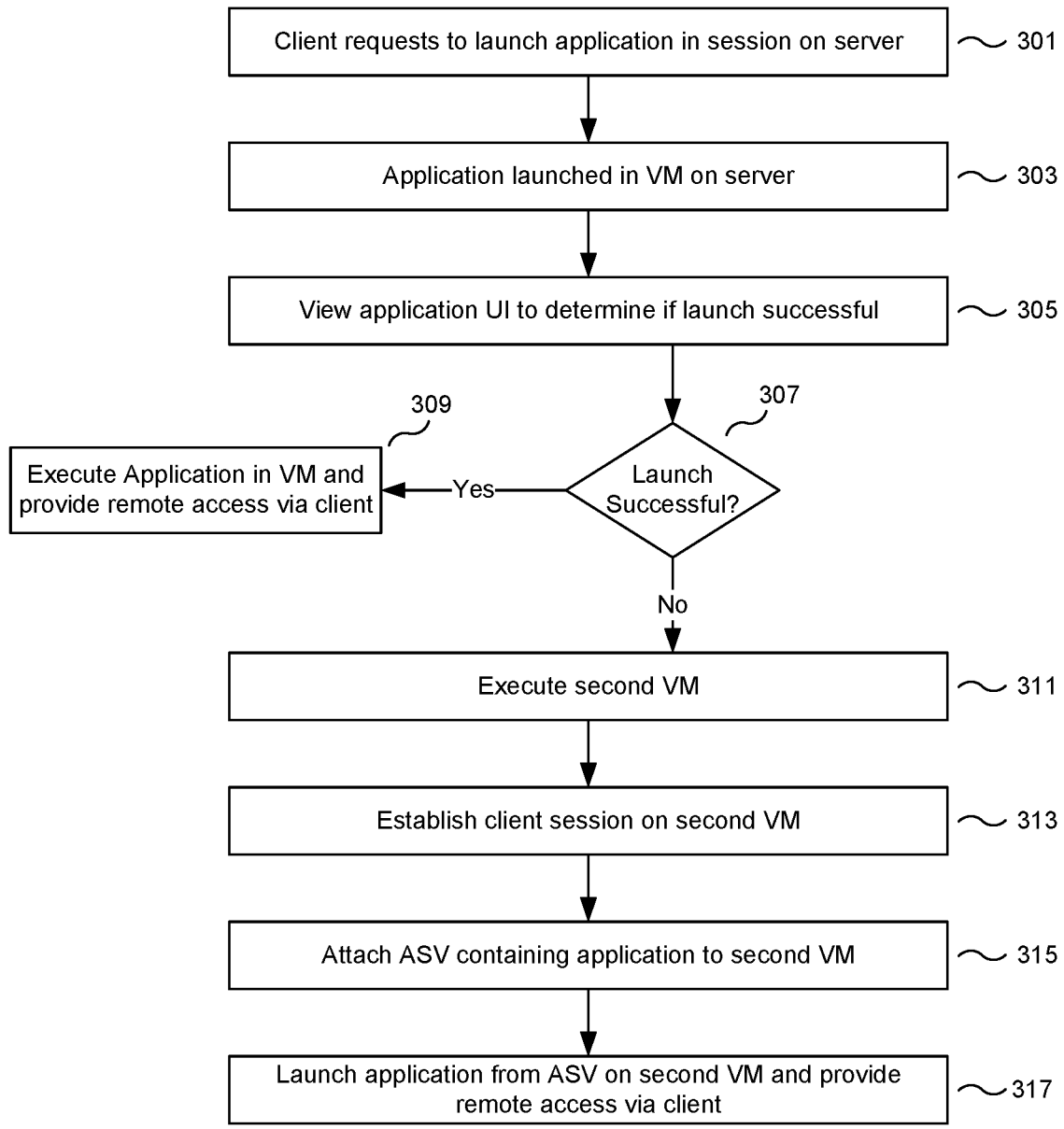
FIG. 3 illustrates a process flow for fault-tolerant application virtualization implementing alternative virtualized delivery of an application, in accordance with various embodiments.

FIG. 3 illustrates a process flow for fault-tolerant application virtualization implementing alternative virtualized delivery of an application, in accordance with various embodiments. The process begins in step 301 with a request being sent from a client operating on a client device to a server configured for hosting virtualized applications to launch an application in the client's session on the server. In step 303, the server launches the application in a first VM in response to the request. In step 305, the UI produced by the application is viewed to determine if the application launched successfully. For example, this may be performed by processing a digital image of the UI produced by the launched application. In step 307, a decision is made on whether the application launched successfully. If the application launched successfully, then the process proceeds to step 309, where the application continues executing in the first VM and the user is provided remote access to the executing application via the session. For example, the executing application's UI is streamed to the client, and user inputs into the application are transmitted from the client to the server and executed in the application.

If, the application did not launch successfully in decision 307, then the process proceeds to step 311, where a second VM is executed. For example, the second VM can be executed on the same server or on a different server. A session is established on the second VM by the client in step 313. An ASV containing the application is attached to the second VM in step 315. In step 317, the application is launched from the ASV on the second VM and the user is provided remote access to the executing application via the client session.

Figure 4:
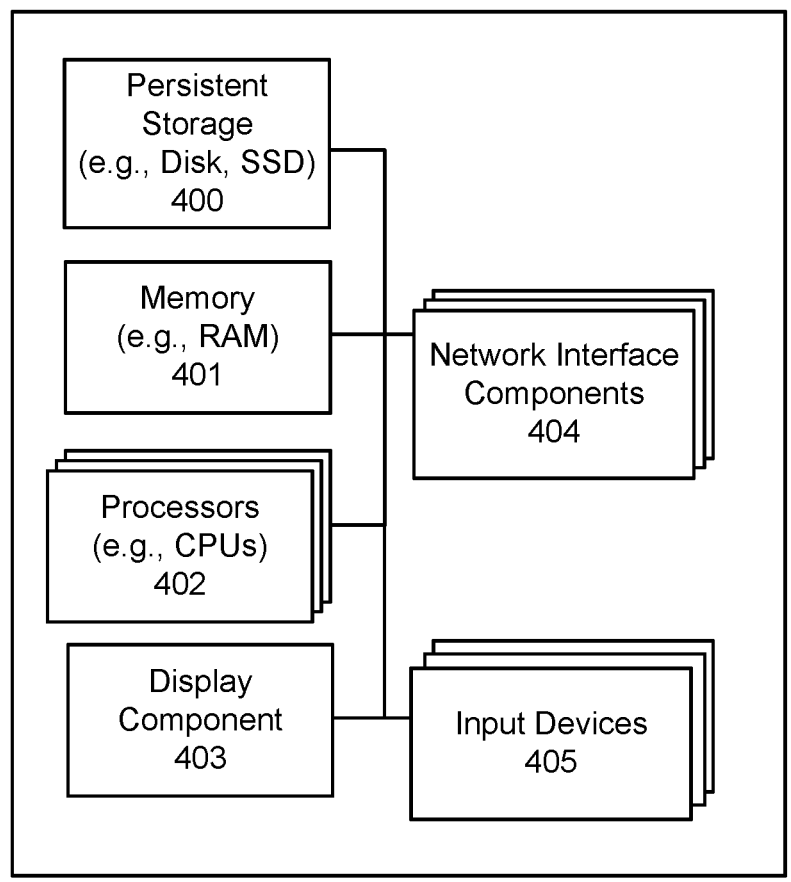
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for fault-tolerant application virtualization, comprising:
   receiving, at a remote server configured for hosting virtualized applications contained in a first virtual machine (VM) on the server, a request from a client application executing on a client device to launch an application;
   in response to the request, launching the application in the first VM on the remote server;
   processing a digital image of a user interface (UI) produced by the launched application;
   determining, based on the processing of the digital image of the UI, that the application failed to launch successfully; and
   in response to determining that the application failed to launch successfully, providing the client application access to the application by at least one of:
      performing a direct delivery of the application, comprising:
         downloading an application storage volume (ASV) containing the application to the client device from the server;
         attaching the ASV to the client device; and
         executing the application from the ASV on the client device; or
      performing an alternative virtualized delivery of the application, comprising:
         attaching the ASV to a second VM;
         executing the application from the ASV in the second VM; and
         providing remote access to the application executing in the second VM to the client application.

2. The method of claim 1, wherein the second VM does not contain the hosted virtualized applications contained in the first VM.

3. The method of claim 1, wherein the determining, based on the processing of the digital image of the UI, that the application failed to launch successfully, further comprises:
   capturing a screenshot of the UI produced by the application after the application is launched on the first VM to produce the digital image of the UI;
   comparing the digital image of the UI to at least one stored reference image of the application's UI corresponding to a successful launch of the application.

4. The method of claim 1, wherein the determining, based on the UI, that the application failed to launch successfully, further comprises:
   comparing the digital image of the UI produced by the application when the application is launched on the first VM to a plurality of stored reference images of the application's UI corresponding to a successful launch of the application; and
   determining that the UI of the application does not match any of the stored reference images of the application's UI corresponding to a successful launch, wherein a match between two images occurs if similarity between the two images surpasses a predetermined threshold.

5. The method of claim 1, wherein performing an alternative virtualized delivery of the application further comprises establishing a remote desktop session by the client application with the second VM.

6. The method of claim 1, wherein the server further stores information for locating ASVs corresponding to the hosted virtualized applications, and wherein the ASV containing the application is located based on the information.

7. The method of claim 1, wherein the ASV is a virtual disk.

8. A computing device for fault-tolerant application virtualization, comprising:
   at least one processor; and
   memory including instructions that, when executed by the at least one processor, cause the computing device to perform the steps of:

receiving, at a remote server configured for hosting virtualized applications contained in a first virtual machine (VM) on the server, a request from a client application executing on a client device to launch an application;

in response to the request, launching the application in the first VM on the remote server;

processing a digital image of a user interface (UI) produced by the launched application;

determining, based on the processing of the digital image of the UI, that the application failed to launch successfully; and in response to determining that the application failed to launch successfully, providing the client application access to the application by at least one of:

performing a direct delivery of the application, comprising:

downloading an application storage volume (ASV) containing the application to the client device from the server;

attaching the ASV to the client device; and executing the application from the ASV on the client device; or performing an alternative virtualized delivery of the application, comprising:

attaching the ASV to a second VM;

executing the application from the ASV in the second VM; and providing remote access to the application executing in the second VM to the client application.

9. The computing device of claim 8, wherein the second VM does not contain the hosted virtualized applications contained in the first VM.

10. The computing device of claim 8, wherein the determining, based on the processing of the digital image of the UI, that the application failed to launch successfully, further comprises:

capturing a screenshot of the UI produced by the application after the application is launched on the first VM to produce the digital image of the UI;

comparing the digital image of the UI to at least one stored reference image of the application's UI corresponding to a successful launch of the application.

11. The computing device of claim 8, wherein the determining, based on the UI, that the application failed to launch successfully, further comprises:

comparing the digital image of the UI produced by the application when the application is launched on the first VM to a plurality of stored reference images of the application's UI corresponding to a successful launch of the application; and determining that the UI of the application does not match any of the stored reference images of the application's UI corresponding to a successful launch, wherein a match between two images occurs if similarity between the two images surpasses a predetermined threshold.

12. The computing device of claim 8, wherein performing an alternative virtualized delivery of the application further comprises establishing a remote desktop session by the client application with the second VM.

13. The computing device of claim 8, wherein the server further stores information for locating ASVs corresponding to the hosted virtualized applications, and wherein the ASV containing the application is located based on the information.

14. The computing device of claim 8, wherein the ASV is a virtual disk.

15. A non-transitory computer readable storage medium for fault-tolerant application virtualization comprising one or more sequences of instructions, the instructions when executed by one or more processors causing the one or more processors to execute the operations of:

receiving, at a remote server configured for hosting virtualized applications contained in a first virtual machine (VM) on the server, a request from a client application executing on a client device to launch an application;

in response to the request, launching the application in the first VM on the remote server;

processing a digital image of a user interface (UI) produced by the launched application;

determining, based on the processing of the digital image of the UI, that the application failed to launch successfully; and in response to determining that the application failed to launch successfully, providing the client application access to the application by at least one of:

performing a direct delivery of the application, comprising:

downloading an application storage volume (ASV) containing the application to the client device from the server;

attaching the ASV to the client device; and executing the application from the ASV on the client device; or performing an alternative virtualized delivery of the application, comprising:

attaching the ASV to a second VM;

executing the application from the ASV in the second VM; and providing remote access to the application executing in the second VM to the client application.

16. The non-transitory computer readable storage medium of claim 15, wherein the second VM does not contain the hosted virtualized applications contained in the first VM.

17. The non-transitory computer readable storage medium of claim 15, wherein the determining, based on the processing of the digital image of the UI, that the application failed to launch successfully, further comprises:

capturing a screenshot of the UI produced by the application after the application is launched on the first VM to produce the digital image of the UI;

comparing the digital image of the UI to at least one stored reference image of the application's UI corresponding to a successful launch of the application.

18. The non-transitory computer readable storage medium of claim 15, wherein the determining, based on the UI, that the application failed to launch successfully, further comprises:

comparing the digital image of the UI produced by the application when the application is launched on the first VM to a plurality of stored reference images of the application's UI corresponding to a successful launch of the application; and determining that the UI of the application does not match any of the stored reference images of the application's UI corresponding to a successful launch, wherein a match between two images occurs if similarity between the two images surpasses a predetermined threshold.

19. The non-transitory computer readable storage medium of claim 15, wherein performing an alternative virtualized delivery of the application further comprises establishing a remote desktop session by the client application with the second VM.

20. The non-transitory computer readable storage medium of claim 15, wherein the server further stores information for locating ASVs corresponding to the hosted virtualized applications, and wherein the ASV containing the application is located based on the information.

\* \* \* \* \*